United States Patent
Sahlin et al.

(10) Patent No.: US 9,590,687 B2
(45) Date of Patent: Mar. 7, 2017

(54) PREFILTERING IN MIMO RECEIVER

(75) Inventors: Henrik Sahlin, Mölnlycke (SE); Miguel Lopez, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 19 days.

(21) Appl. No.: 14/408,651

(22) PCT Filed: Jun. 18, 2012

(86) PCT No.: PCT/SE2012/050670
§ 371 (c)(1),
(2), (4) Date: Dec. 17, 2014

(87) PCT Pub. No.: WO2013/191597
PCT Pub. Date: Dec. 27, 2013

(65) Prior Publication Data
US 2015/0303970 A1    Oct. 22, 2015

(51) Int. Cl.
*H04L 27/06* (2006.01)
*H04B 1/40* (2015.01)
(Continued)

(52) U.S. Cl.
CPC .............. *H04B 1/40* (2013.01); *H04B 7/0413* (2013.01); *H04L 25/0204* (2013.01);
(Continued)

(58) Field of Classification Search
CPC ..... H04B 1/40; H04B 7/0413; H04L 25/0204; H04L 25/0228; H04L 25/0242;
(Continued)

(56) References Cited

U.S. PATENT DOCUMENTS 6,018,317 A    1/2000  Dogan et al.
6,215,983 B1   4/2001  Dogan et al.
(Continued)

FOREIGN PATENT DOCUMENTS

GB    2453776 A    4/2009

OTHER PUBLICATIONS

Davies, Martin et al., "A Polynomial QR Decomposition Based Turbo Equalization Technique for Frequency Selective MIMO Channels", IEEE Vehicular Technology Conference, 2009, 1-5.*

(Continued)

*Primary Examiner* — Daniel Washburn
*Assistant Examiner* — Berhanu Tadese
(74) *Attorney, Agent, or Firm* — Murphy, Bilak & Homiller, PLLC

(57) ABSTRACT

Data signals transmitted by a plurality of transmitting antennas over a radio channel are demodulated. The method comprises receiving (202) on a plurality of receiving antennas, a data signal and a reference signal, the contents of the reference signal being known a priori to the receiver. The contents of the reference signal are used for calculating (204) an estimated polynomial channel matrix. A polynomial pre-filter matrix is calculated (206, 208) by a decomposition of the estimated polynomial channel matrix into a product of a paraunitary polynomial matrix and an upper triangular polynomial matrix with minimum phase filters on its main diagonal, where the polynomial pre-filter matrix is obtained by calculating the paraconjugate of the paraunitary polynomial matrix. The received data signal is demodulated (212) where the received data signal is multiplied with the calculated polynomial pre-filter matrix.

15 Claims, 4 Drawing Sheets

(51) Int. Cl.
- *H04B 7/04* (2006.01)
- *H04L 25/03* (2006.01)
- *H04L 25/02* (2006.01)

(52) U.S. Cl.
CPC ...... *H04L 25/0228* (2013.01); *H04L 25/0242* (2013.01); *H04L 25/0246* (2013.01); *H04L 25/03* (2013.01); *H04L 25/03891* (2013.01); *H04L 2025/03426* (2013.01)

(58) Field of Classification Search
CPC ............... H04L 25/0246; H04L 25/03; H04L 25/03891; H04L 2025/08426
USPC .......................................................... 375/340
See application file for complete search history.

(56) References Cited

U.S. PATENT DOCUMENTS

| | | | | |
|---|---|---|---|---|
| 6,826,226 | B1* | 11/2004 | Sahlin | H04L 25/03038 375/232 |
| 6,862,326 | B1* | 3/2005 | Eran | H04L 25/03993 375/229 |
| 8,169,944 | B2* | 5/2012 | Walton | H04B 7/0413 370/313 |
| 8,243,861 | B2* | 8/2012 | Mostafa | H04B 17/345 375/254 |
| 8,619,910 | B1* | 12/2013 | Lee | H04L 25/03057 370/334 |
| 2002/0176492 | A1* | 11/2002 | Zangi | H04L 1/0618 375/233 |
| 2004/0001537 | A1* | 1/2004 | Zhang | H04L 1/0631 375/229 |
| 2004/0047426 | A1* | 3/2004 | Nissani Nissensohn | H04L 25/0242 375/259 |
| 2004/0247055 | A1* | 12/2004 | Hui | H04L 1/0618 375/341 |
| 2005/0047323 | A1* | 3/2005 | Clarkson | H04L 27/2627 370/203 |
| 2005/0105646 | A1* | 5/2005 | Arslan | H04L 25/03133 375/316 |
| 2005/0228656 | A1* | 10/2005 | Den Brinker | G10L 19/04 704/224 |
| 2006/0256888 | A1* | 11/2006 | Nissani (Nissensohn) | H04L 1/02 375/267 |
| 2008/0125109 | A1* | 5/2008 | Larsson | H04L 25/03343 455/424 |
| 2008/0317141 | A1* | 12/2008 | Burg | H04B 7/0854 375/260 |
| 2009/0041107 | A1* | 2/2009 | Al-Dhahir | H04B 1/7103 375/233 |
| 2009/0238380 | A1* | 9/2009 | Brannmark | H03G 5/005 381/98 |
| 2010/0034241 | A1* | 2/2010 | Krishnamurthy | H04L 25/03292 375/219 |

OTHER PUBLICATIONS

Randt, Rasmus, "Polynomial Matrix Decompositions: Evaluation of Algorithms with an Application to Wideband MIMO Communications", Uppsala University, Thesis, 2010, 1-84.*
3GPP, "3rd Generation Partnership Project; Technical Specification Group GSM/EDGE Radio Access Network; Physical layer on the radio path; General description (Release 10)", 3GPPTS 45.001 V10.1.0, Nov. 2011, 1-44.*
3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, 1-83.*
Comon, Pierre, "Blind Techniques", Jan. 2010—Internet Citation: Retrieved from: http://www.gipsa-lab.grenoble-inp.fr/~pierre.comon/FichiersPdf/polyD16-2006.pdf.*
J. Foster et al., A novel algorithm for calculating the QR decomposition of a polynomial matrix, IEEE_ICASSP, 2009, pp. 3177-3180.*
Brandt, Rasmus et al., "Wideband MIMO Channel Diagonalization in the Time Domain", 2011 IEEE 22nd International Symposium on Personal, Indoor and Mobile Radio Communications, 1958-1962.*
Cescato, Davide, "QR Decomposition of Laurent Polynomial Matrices Sampled on the Unit Circle", IEEE Transactions on Information Theory, vol. 56, No. 9, Sep. 2010, 4754-4761.*
Smith J. O., Minimum-Phase_Allpass Decomposition—Online book, 2007 edition, http_ccrma.stanford.edu_jos_filters,—accessed Aug. 21, 2015.*
Smith, J.O. Definition of Minimum Phase Filters—Online book, 2007 edition, http_ccrma.stanford.edu_jos_filters,—accessed Aug. 21, 2015.*
Fischer, Robert F. et al., "Signal Processing in Receivers for Communication over MIMO ISI Channels", IEEE 3rd International Symposium on Signal Processing and Information Technology, Dec. 14-17, 2003, 298-301.*
Cescato, Davide et al., "Algorithms for Interpolation-Based QR Decomposition in MIMO-OFDM Systems", IEE Transactions on Signal Processing, vol. 59, No. 4, Apr. 2011, 1719-1733.*
3GPP, "3rd Generation Partnership Project; Technical Specification Group GSM/EDGE Radio Access Network; Physical layer on the radio path; General description (Release 10)", 3GPP TS 45.001 V10.1.0, Nov. 2011, 1-44.
Brandt, Rasmus, "Polynomial Matrix Decompositions: Evaluation of Algorithms with an Application to Wideband MIMO Communications", Uppsala University, Thesis, 2010, 1-84.
Chai, Li-Wei, "Reduced-Complexity Interpolation-based QR Decomposition using Partial Layer Mapping", IEEE International Symposium on Circuits and Systems, May 2011, 2381-2384.
Foster, Joanne et al., "A Polynomial Matrix QR Decomposition with Application to MIMO Channel Equalisation", IEEE 2007, Forty-First Asilomar Conference on Signals, Systems and Computers, 1379-1383.
Foster, Joanne et al., "An Algorithm for Calculating the QR and Singular Value Decompositions of Polynomial Matrices", IEEE Transactions on Signal Processing, vol. 58, No. 3, Mar. 2010, 1263-1274.
Gao, Xiqi et al., "On Factorization of M-Channel Paraunitary Filterbanks", IEEE Transactions on Signal Processing, vol. 49, No. 7, Jul. 2001, 1433-1446.
Henrion, Didier et al., "Hyperbolic QR factorization for J—spectral factorization of polynomial matrices", Proceeding or the 42nd IEEE, Conference on Decision and Control, ThA13-1, Maui, Hawaii USA, Dec. 2003, 3479-3484.
Henrion, Didier et al., "Reliable Numerical Methods for Polynomial Matrix Triangularization", IEEE Transactions on Automatic Control, vol. 44, No. 3, Mar. 1999, 497-508.
Joanne, Foster et al., "A Novel Algorithm for Calculating the QR Decomposition of a Polynomial Matrix", IEEE, ICASSP 2009, 3177-3180.
Maeng, Seung J. et al., "Polynomial Matrix Decomposition for Use in LBR Two-Pair Realizations", Mar. 28, 1997, 1-13.
McWhirter, John et al., "An algorithm for Polynomial Matrix SVD Based on Generalised Kogbetliantz Transformations", 18th European Signal Processing Conference (EUSIPCO-2010), Aalborg, Denmark, Aug. 23-27, 2010, 457-461.
McWhirter, John, "An EVD Algorithm for Para-Hermitian Polynomial Matrices", IEEE Transactions on Signal Processing, vol. 55, No. 5, May 2007, 2158-2169.
Rota, Ludwig et al., "Blind MIMO Equalization Under Paraunitary Constraint", Rapport de recherche, I3S/RR-2002-35-FR, Sep. 2002, 1-19.

* cited by examiner

PREFILTERING IN MIMO RECEIVER

TECHNICAL FIELD

The field of the present disclosure is that of controlling a multiple input multiple output, MIMO, receiver. Specifically, calculations associated with determining the characteristics of the radio channel between a transmitter and the MIMO receiver in order to improve performance when demodulating received signals.

BACKGROUND

In mobile radio communication systems that use Multi-User MIMO, MU-MIMO, several users are scheduled to transmit simultaneously during the same time and frequency interval. These users can be distinguished by allocating different, and preferably orthogonal, reference signals to them such that all channels from all transmit antennas to all receive antennas can be estimated. The reference signals, or training sequence, are sequences known to the receiver and they are transmitted together with user signals such that the receiver can estimate distortions of the received signal after it is transmitted.

MU-MIMO forms part of, e.g., the third generation partnership project, 3GPP, standards including the global system for mobile communication, GSM, as well as the long term evolution, LTE, standard.

A radio communication between a UE and a base-station will be affected by multi path propagation, fading, frequency errors, round trip times etc. This communication channel is often referred to as an air interface, and causes bit and block errors on information transmitted. A receiver is designed in order to reduce bit error and block error rates, which among others, includes channel estimation, demodulation and decoding blocks. Other processing blocks commonly used in uplink receivers includes spatial and temporal whitening and pre-filtering, as illustrated in FIG. 3.

The received signal in a MIMO system with N transmitters and M receiver antennas subject to an ISI channel can be described as $$Y(n) = \sum_{k=0}^{L} H(k)S(n-k) + W(n) = H(z^{-1})S(n) + W(n) \quad (1)$$

where $W(n)$ is a $M \times 1$ vector with additive noise and interference, $S(n)$ is a $N \times 1$ vector with transmitted signals $$S(n)=[s_1(n)s_2(n)Ks_N(n)]^T \quad (2)$$

and $H(z^{-1})$ is an $M \times N$ channel matrix with polynomial entries in the unity delay operator $z^{-1}$, $z^{-1}s(n)=s(n-1)$, such that the element in row i and column j equals $$h_{i,j}(z^{-1})=h_{i,j,0}+h_{i,j,1}z^{-1}+h_{i,j,2}z^{-2}+K+h_{i,j,L}z^{-L} \quad (3)$$

A polynomial in the unity delay operator is thus a compact description of a time invariant FIR filter.

Polynomial QR decomposition is described in the prior art:
J. Foster, J. McWhriter and J. Chambers, "*A polynomial matrix QR decomposition with application to MIMO channel equalization*", Forty-First Asilomar Conference on Signals, Systems and Computers, (ACSSC 2007), Pacific Grove, Calif., November 4-7, pp. 1379-1383,
M. Davies, S. Lambotharan, and J. Foster, "*A polynomial QR decomposition based turbo equalization technique for frequency selective MIMO channels*", Proceedings of 2009 69th Vehicular Technology Conference (VTC 2009), Barcelona, Spain, 2009, and
D. Cescato and H. Bölcskei, "*QR decomposition of Laurent polynomial matrices sampled on the unit circle*", presented at IEEE Transactions on Information Theory, 2010, pp. 4754-4761.

Using polynomial QR decomposition, as described in the prior art, of the channel matrix results in $$Q(z^{-1})R(z^{-1})=H(z^{-1}) \quad (4)$$

where $R(z^{-1})$ is an upper triangular polynomial matrix of size $N \times N$ $$R(z^{-1}) = \begin{bmatrix} r_{1,1}(z^{-1}) & r_{1,2}(z^{-1}) & \Lambda & r_{1,N}(z^{-1}) \\ 0 & r_{2,2}(z^{-1}) & & M \\ M & & O & \\ 0 & K & 0 & r_{N,N}(z^{-1}) \end{bmatrix} \quad (5)$$

and $Q(z^{-1})$ is a paraunitary polynomial matrix of size $M \times N$. A matrix $Q(z^{-1})$ is a paraunitary polynomial matrix if $$Q(z^{-1})Q^{*T}(z)=I_M,$$

$$Q^{*T}(z)Q(z^{-1})=I_N \quad (6)$$

where $I_M$ and $I_N$ are unitary matrices of size M and N, respectively. The paraconjugate of a matrix is defined as $$\tilde{Q}(z^{-1}) \triangleq Q^{*T}(z). \quad (7)$$

where $Q^{*T}(z)$ denotes a matrix with conjugate of the coefficients, $z^{-1}$ replaced by z and transpose of the matrix $Q(z^{-1})$. From (4) and (6) follows that a multiplication of (1) with $\tilde{Q}(z^{-1})$ results in $$Y_P(n)=\tilde{Q}(z^{-1})Y(n)=R(z^{-1})S(n)+\tilde{Q}(z^{-1})W(n) \quad (8)$$

i.e. a signal with upper triangular channel matrix $R(z^{-1})$. The multiplication with the polynomial matrix $\tilde{Q}(z^{-1})$ is referred to as a MIMO pre-filter.

Assume that the additive noise and interference $W(n)$ is temporally white and uncorrelated between the antenna branches i.e.

$$E\{W(n)W^{*T}(n-m)\}=I_M\delta(m) \quad (9)$$

This can e.g. be accomplished by spatial-temporal whitening prior to (1), as illustrated by the whitening function 302 in FIG. 3. Since $\tilde{Q}(z^{-1})$ is paraunitary, the whiteness and uncorrelateness of the additive nose and interference in (8) is preserved i.e.

$$E\{\tilde{Q}(z^{-1})W(n)(\tilde{Q}(z)W(n-m))^{*T}\}=$$
$$\tilde{Q}(z^{-1})\tilde{Q}^{*T}(z)\cdot\delta(m)=I_N\cdot\delta(m). \quad (10)$$

A turbo equalizer can now be used for equalization and demodulation of the transmitted symbols in $S(n)$, e.g. as outlined in Davies et al.

A polynomial decomposition is proposed in Foster et al. which is based on Givens rotations. Here several iterations are needed in order for the QR decomposition to converge.

A polynomial QR-decomposition is also described in Cescato and Bölcskei. Here, the channel $H(\omega_n)=H(z^{-1})|_{z=e^{j\omega_n}}$ is available for a number of discrete frequencies $\omega_n$. A QR-decomposition of these channel matrices is described such that an interpolation to any frequency is available.

The complexity of a demodulator typically increases with the length of the radio channel. In order to reduce computational complexity, a short channel model is beneficial. With a minimum phase channel model, most of the energy is concentrated in the first taps of the channel. However a polynomial QR decomposition as done in Foster et al. is based upon Givens rotations which do not guarantee minimum phase channel after pre-filtering.

SUMMARY

In order to mitigate at least some of the drawbacks as discussed above, there is provided in a first aspect a method in a radio receiver for demodulating data signals transmitted by a plurality of transmitting antennas over a radio channel. The method comprises receiving on a plurality of receiving antennas, a data signal and a reference signal, the contents of the reference signal being known a priori to the receiver. The contents of the reference signal are used for calculating an estimated polynomial channel matrix. A calculation is then made of a decomposition of the estimated polynomial channel matrix into a product of a paraunitary polynomial matrix and an upper triangular polynomial matrix with minimum phase filters on its main diagonal. A polynomial pre-filter matrix is calculated as the paraconjugate of this paraunitary polynomial matrix. The received data signal is demodulated where the received data signal is multiplied with the calculated polynomial pre-filter matrix.

In some embodiments, the calculation of the decomposition comprises:
assigning, to the first column of the paraunitary polynomial matrix, a normalized version of the first column of the estimated polynomial channel matrix, and for each current column from a second column to a last column of the channel matrix:
calculating projections of the current column of the estimated polynomial channel matrix on the previous columns of the paraunitary polynomial matrix,
calculating a difference polynomial vector as the difference between the current column of the estimated polynomial channel matrix and a product of the calculated projections multiplied by the previous columns of the paraunitary polynomial matrix, and
assigning, to the current column of the paraunitary polynomial matrix, a normalized version of the calculated difference polynomial vector.

In some embodiments, the calculation of the decomposition comprises:
assigning, to an auxiliary polynomial matrix, the elements of the estimated polynomial channel matrix, and for each current column from a first column to a last column:
assigning, to the current column of the paraunitary polynomial matrix, a normalized version of the current column of the auxiliary polynomial matrix,
calculating projections of the auxiliary polynomial matrix on the current column of the paraunitary polynomial matrix,
updating the auxiliary polynomial matrix by subtracting a product of the current column of the paraunitary polynomial matrix and the calculated projections from the auxiliary polynomial matrix.

In other words, a MIMO pre-filter in a receiver is provided which results in a channel matrix which is upper triangular and with minimum phase filters on its main diagonal. A minimum phase polynomial has the following energy compaction property: for any the sum of the energy contained in the first k taps is larger than the energy contained in the first k taps of any other polynomial having the same spectrum. The polynomial coefficients correspond to channel tap values in the equalizer of a receiver in which the method is realized. Therefore, the MIMO pre-filter of the present disclosure reduces the channel to a triangular form while at the same time reshapes the diagonal entries by compacting the channel energy. Both triangularization and energy compaction are very useful properties in order to reduce the computational complexity of the demodulator of a receiver in which the method is realized.

Such a MIMO pre-filter is an essential component in many practical MIMO or MU-MIMO Joint Detection receivers. For example, it can be used in high performance joint detection UL and DL VAMOS receivers. Advantages that are provided by the present disclosure include the fact that it provides simultaneous triangularization and channel re-shaping for energy compaction. The latter property is a key in order to efficiently cope with ISI. Furthermore, low computational complexity is provided. More specifically, as will be elucidated further below, the calculations require only one spectral factorization and one long division per transmitted layer in order to calculate the pre-filter. It is to be noted that many of the algorithms available in the prior art are not practical for implementation in typical mobile communication terminal or radio base station digital signal processing hardware. The present disclosure provides algorithms that are readily implemented in fixed point digital signal processors.

In a second aspect there is provided a radio receiver for demodulating data signals transmitted by a plurality of transmitting antennas over a radio channel. The receiver comprises control and communication circuitry configured to receive, on a plurality of receiving antennas, a data signal and a reference signal, the contents of the reference signal being known a priori to the receiver, calculate, using the contents of the reference signal, an estimated polynomial channel matrix, calculate a decomposition of the estimated polynomial channel matrix into a product of a paraunitary polynomial matrix and an upper triangular polynomial matrix with minimum phase filters on its main diagonal, calculate a polynomial pre-filter matrix as the paraconjugate of the paraunitary polynomial matrix and demodulate the received data signal where the received data signal is multiplied with the calculated polynomial pre-filter matrix.

In a third aspect there is provided a computer program product comprising software instructions that are configured, when executed in a processing device, to perform the method of the first aspect.

The effects and advantages of the second and third aspects correspond to those summarized above in connection with the first aspect.

DETAILED DESCRIPTION OF EMBODIMENTS

Figure 1:
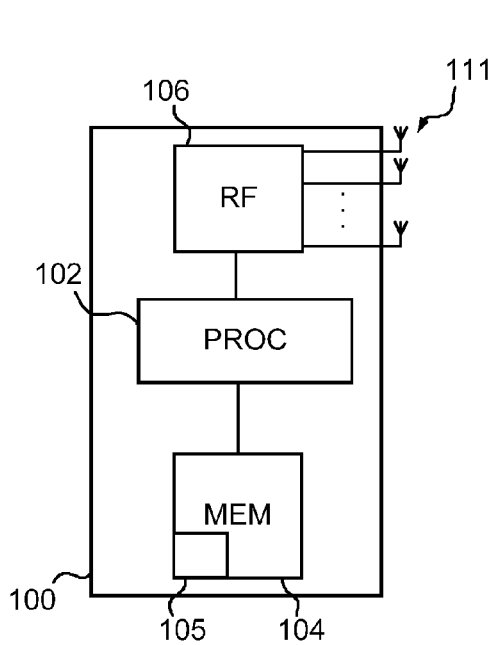
FIG. 1 schematically illustrates a radio receiver.

FIG. 1 illustrates schematically a MIMO enabled mobile communication terminal 100 comprising a processor 102, a memory 104, radio frequency, RF, receiving and transmitting circuitry 106 and a plurality of antenna elements 111. Radio communication via the antennas 111 is realized by the RF circuitry 106 controlled by the processor 102, as the skilled person will understand. The processor 102 makes use of software instructions 105 stored in the memory 104 in order to control all functions of the terminal 100, including the functions of receiver circuitry in the RF circuitry 106 to be described in detail below with regard to demodulation. In other words, at least the RF circuitry 106, the processor 102 and the memory 104 form parts of control and communication circuitry that is configured to control demodulation as summarized above and described in detail below. Further details regarding how these units operate in order to perform normal functions within a mobile radio communication system, are outside the scope of the present disclosure and are therefore not discussed further.

Figure 2:
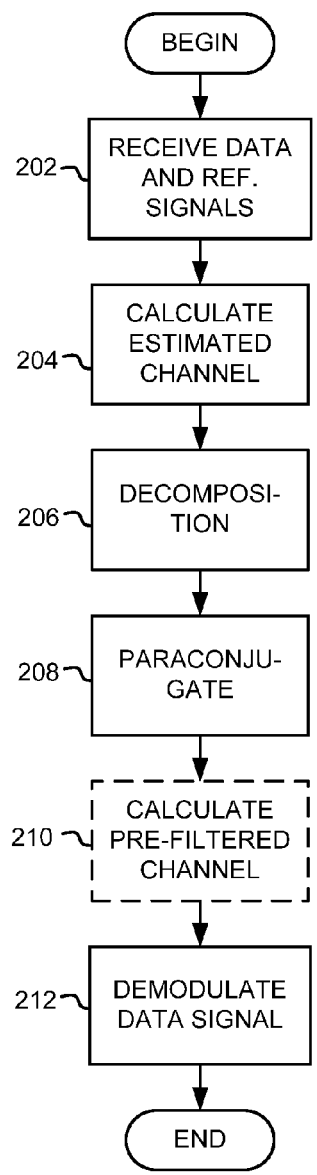
FIG. 2 is a flow chart of a method in a receiver.
Figure 3:
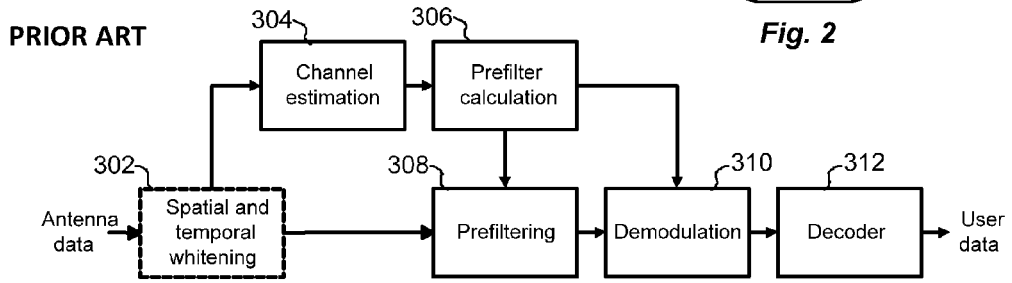
FIG. 3 illustrates schematically functional blocks of a radio receiver.

Turning now to FIG. 2 and FIG. 3, a method in a radio receiver for demodulating data signals transmitted by a plurality of transmitting antennas over a radio channel will be described.

In a reception step 202, a data signal and a reference signal is received on a plurality of receiving antennas. The contents of the reference signal are known a priori to the receiver. For example, in an implementation in a GSM system, the reference signal can be the training sequence that is transmitted in a data burst and in a LTE system implementation it can be the reference signals that form part of a sub-frame. In a calculation step 204, a calculation of an estimated polynomial channel matrix is made using the contents of the reference signal. The calculation of the estimated polynomial channel matrix is followed by a calculation of a polynomial pre-filter matrix. A calculation is done of a decomposition 206 of the estimated polynomial channel matrix into a product of a paraunitary polynomial matrix and an upper triangular polynomial matrix with minimum phase filters on its main diagonal. The polynomial pre-filter matrix is then calculated 208 as the paraconjugate of the paraunitary polynomial matrix. The received data signal is then demodulated in a demodulation step 212, where the received data signal is multiplied with the calculated polynomial pre-filter matrix.

A calculation can be made, in an optional third calculation step 210 prior to the demodulation step 212, of a pre-filtered polynomial channel matrix by multiplying the estimated polynomial channel matrix with the polynomial pre-filter matrix, thereby making the pre-filtered polynomial channel matrix upper triangular and with minimum phase filters on its main diagonal. In such cases, the demodulation step 212 also includes using this pre-filtered polynomial channel matrix as the channel model in the demodulation. The use of the pre-filtered polynomial channel matrix as the channel model in the demodulation can involve calculating the difference between the received data signal and symbol candidates filtered with the pre-filtered polynomial channel matrix.

This method can be illustrated in a block function, as presented in FIG. 3. Antenna data, i.e. data signals and reference signals, are received and are subject to spatial and temporal whitening 302. The output of this whitening procedure is provided to a channel estimation function 304, which in turn provides output to a pre-filter calculation function 306. The output of the pre-filter calculation function 306 is used in a pre-filtering function 308 as well as in a demodulation function 310. The output from the demodulation function 310 is then decoded into user data in a decoder function 312.

Figure 4:
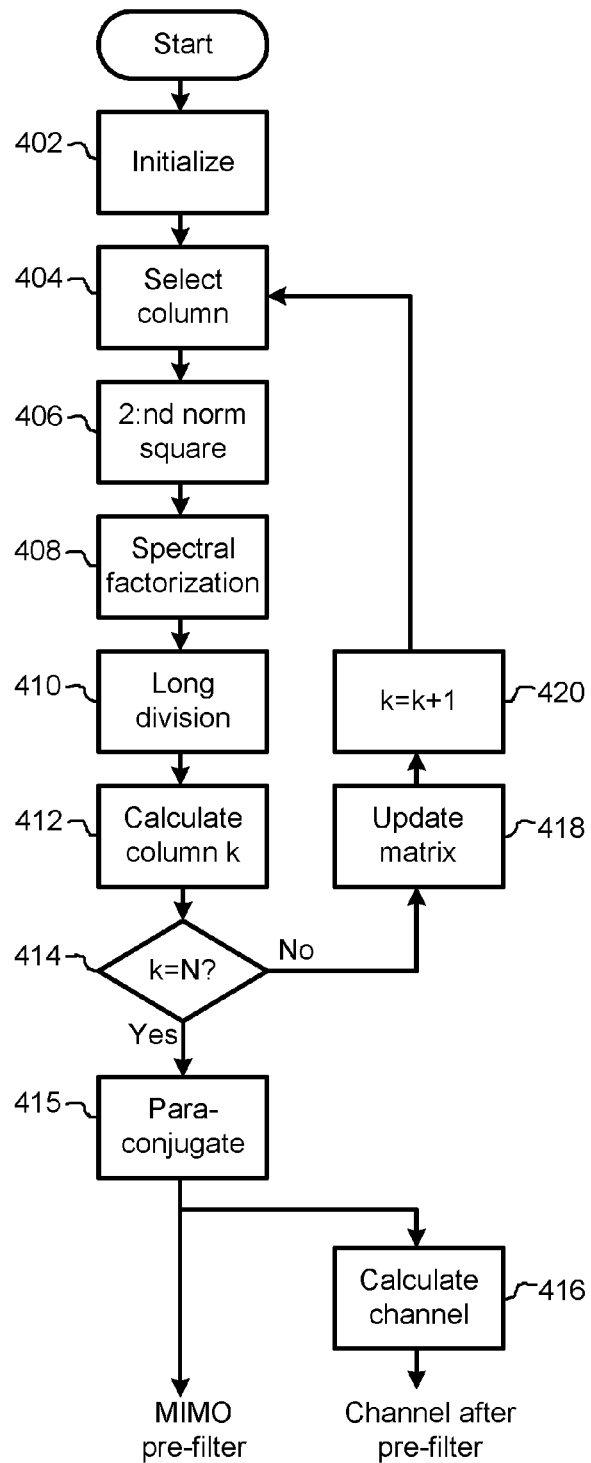
FIG. 4 is a flow chart of a method in a receiver.

Turning now to FIG. 4, a more detailed description will be given of examples of calculations of MIMO pre-filters. The calculations are based on polynomial QR-decomposition, spectral factorizations and long divisions, and the sequence of steps is as follows:

In an initialisation step 402, a column counter k is set to the first column.

In a column setting step 404, column k of the channel matrix is selected for processing.

In a first calculation step 406, the square of the second norm of one column is calculated.

In a second calculation step 408, spectral factorization is performed.

In a third calculation step 410, long division is performed.

In a fourth calculation step 412, column k of a paraunitary polynomial matrix is calculated.

If all columns have been considered, as checked in a decision step 414, the paraunitary polynomial matrix is available and used in a calculation step 415 where the pre-filter matrix is obtained as the paraconjugate of the paraunitary polynomial matrix. The channel after pre-filter is obtained in a fifth calculation step 416.

If it is found, in the checking step 414, that not all columns have been considered, preparations for processing the next column is performed in an updating step 418 where matrix values are updated in preparation for calculation of values for next column. k is then incremented in an increment step 420, whereupon the procedure returns to the column setting step 404.

In the following, details will be presented of the different steps in FIG. 4. Two alternative polynomial QR decompositions can be used. First, a description is given of a polynomial QR decomposition based upon a Classical Gram-Schmidt, CGS, procedure and secondly a Modified Gram Schmidt, MGS, is described. Descriptions of CGS and MGS algorithms for non-polynomial matrices can e.g. be found in Davies et al.

Both in the CGS and in the MGS, spectral factorizations and long divisions are used. A short description of the spectral factorization is given below.

When multiplying polynomial, the polynomial degree of the result is the sum of the degrees of the involved polynomials. In both CGS and MGS, the degrees of the resulting polynomials increase with each new column of. Polynomial truncations are described below for both CGS and MGS.

The channel after pre-filter is calculated as a polynomial multiplication between the calculated pre-filter and the channel estimate as also illustrated in FIG. 4.

Polynomial QR Decompositions
Classical Gram Schmidt

The first column $q_1(z^{-1})$ of $Q(z^{-1})$ is defined as a normalized version of the first column $h_1(z^{-1})$ of $H(z^{-1})$. This normalization is done with a scalar minimum phase polynomial $h_{MP,1}(z^{-1})$, i.e. a polynomial with all roots located inside the unit circle. This minimum phase polynomial is calculated from a spectral factorization of the scalar squared second norm of the first column $h_1(z^{-1})$ of $H(z^{-1})$, i.e.

$$s_1(z^{-1}) = h_1^{*T}(z)h_1(z^{-1}) = \sum_{i=1}^{M} h_{i1}^*(z)h_{i1}(z^{-1}) \quad (11)$$

such that $$h_{MP,1}(z^{-1}) = \text{MinPhaseFactor}\{s_1(z^{-1})\}. \quad (12)$$

See below for more details about spectral factorizations.

The inverse of this minimum phase polynomial in (12) is approximated by a finite impulse response, FIR, polynomial after long division, $$\frac{1}{h_{MP,1}(z^{-1})} \approx h_{MPinv,1}(z^{-1}) = \qquad (13)$$

$$h_{MPinv,1,0} + h_{MPinv,1,1}z^{-1} + K + h_{MPinv,1,L_{LD}}z^{-L_{LD}}.$$

Here, the length of the FIR approximation is considered as a design variable which must be selected with care. Now, the elements $q_{i,1}(z^{-1})$, for i=1, K, M, of the first column of $Q(z^{-1})$ are calculated as $$q_{i,1}(z^{-1}) = h_{MPinv,1}(z^{-1})h_{i1}(z^{-1}), \qquad (14)$$

for i=1, K, M, and $$r_{1,1}(z^{-1}) = h_{MP,1}(z^{-1}). \qquad (15)$$

The remaining columns of $Q(z^{-1})$ should now be calculated. These columns $q_k(z^{-1})$ of $Q(z^{-1})$ will be sequentially calculated, with k=2, K, N. Start by setting k=2 and calculate column k of $R(z^{-1})$ as the projection of $H(z^{-1})$ on the previously calculated column of $Q(z^{-1})$ i.e.

$$r_{j,k}(z^{-1}) = q_j^{*T}(z)h_k(z^{-1}) \qquad (16)$$

for j=1, K, k−1. Use these projections in order to calculate a polynomial vector $a_k(z^{-1})$ of the difference between column k of $H(z^{-1})$ and (16) multiplied by previously calculated column of $Q(z^{-1})$ i.e.

$$a_k(z^{-1}) = h_k(z^{-1}) - \sum_{i=1}^{k-1} r_{i,k}(z^{-1})q_i(z^{-1}). \qquad (17)$$

Column $q_k(z^{-1})$ of $Q(z^{-1})$ is defined as a normalized version of $a_k(z^{-1})$ for k>2. This normalization is done with a scalar minimum phase polynomial $a_{MP,k}(z^{-1})$ which is calculated from a spectral factorization of the squared second norm of the column vector $a_k(z^{-1})$. Denote this squared second norm as $$s_k(z^{-1}) = a_k^{*T}(z)a_k(z^{-1}) = \sum_{i=1}^{M} a_{i,k}^*(z)a_{i,k}(z^{-1}) \qquad (18)$$

Also denote the minimum phase factor polynomial of (11) as $$a_{MP,k}(z^{-1}) = \text{MinPhaseFactor}\{s_k(z^{-1})\}. \qquad (19)$$

See below for more details about spectral factorizations.
The inverse of this minimum phase polynomial in (12) is approximated by a FIR polynomial after long division as $$\frac{1}{a_{MP,k}(z^{-1})} \approx a_{MPinv,k}(z^{-1}) = \qquad (20)$$

$$a_{MPinv,k,0} + a_{MPinv,k,1}z^{-1} + K + a_{MPinv,k,L_{LD}}z^{-L_{LD}}.$$

Since $a_{MP,k}(z^{-1})$ is minimum phase this FIR approximation is numerically good. Now, the elements of column k of $Q(z^{-1})$ is calculated as $$q_{i,k}(z^{-1}) = a_{MPinv,k}(z^{-1})a_{i,k}(z^{-1}) \qquad (21)$$

for i=1, K, M and $$r_{k,k}(z^{-1}) = a_{MP,k}(z^{-1}). \qquad (22)$$

Finally, repeat (16) to (22) for the remaining columns of $Q(z^{-1})$.

Modified Gram Schmidt

Within the Modified Gram Schmidt, MGS, algorithm, the columns $q_k(z^{-1})$ of $Q(z^{-1})$ are sequentially (k=1, K, N) calculated. Compare with the Classical Gram Schmidt, CGS, algorithm where also each column of $Q(z^{-1})$ is sequentially calculated. However, while CGS calculates each column of $R(z^{-1})$ sequentially (see equation (16)), the MGS calculates each row of $R(z^{-1})$ sequentially.

First, define the matrix $$A^{(k)}(z^{-1}) = [a_1^{(k)}(z^{-1})a_2^{(k)}(z^{-1})\Lambda a_n^{(k)}(z^{-1})] \qquad (23)$$

with $$A^{(1)}(z^{-1}) = H(z^{-1}) \qquad (24)$$

For k=1, the first column $q_1(z^{-1})$ of $Q(z^{-1})$ is defined as a normalized version of the first column $a_1^{(1)}(z^{-1})$ of $A^{(1)}(z^{-1})$. This normalization is done with a scalar minimum phase polynomial $a_{MP,1}(z^{-1})$, i.e. all roots of the polynomial are located inside the unit circle. A minimum phase polynomial is calculated from a spectral factorization of the squared second norm of the first column $a_1^{(1)}(z^{-1})$ of $A^{(1)}(z^{-1})$. Then, a new polynomial matrix $A^{(2)}(z^{-1})$ will be calculated below, in which the projections of $A^{(1)}(z^{-1})$ on this first column of $Q(z^{-1})$ is subtracted. The second column of $Q(z^{-1})$ is then calculated as a normalized version of the second column of this $A^{(2)}(z^{-1})$. The remaining columns of $Q(z^{-1})$ are sequentially calculated in the same fashion.

Below, a description is given for calculating column k of $Q(z^{-1})$ and row k of $R(z^{-1})$. This description is valid for k=1, K, N.

Denote the squared second norm of column k of $A^{(k)}(z^{-1})$ as $$s_k(z^{-1}) = a_k^{(k)*T}(z)a_k^{(k)}(z^{-1}) = \sum_{i=1}^{M} a_{ik}^{(k)*}(z)a_{ik}^{(k)}(z^{-1}) \qquad (25)$$

Also denote the minimum phase factor polynomial of (25) as $$a_{MP,k}(z^{-1}) = \text{MinPhaseFactor}\{s_k(z^{-1})\}. \qquad (26)$$

See below for more details about spectral factorizations.
The inverse of this minimum phase polynomial in (26) is approximated by a FIR polynomial after long division as $$\frac{1}{a_{MP,k}(z^{-1})} \approx a_{MPinv,k}(z^{-1}) = \qquad (27)$$

$$a_{MPinv,k,0} + a_{MPnv,k,1}z^{-1} + K + a_{MPnv,k,L_{LD}}z^{-L_{LD}}.$$

Since $a_{MP,k}(z^{-1})$ is minimum phase (all roots inside the unit circle), this FIR approximation is numerically good. Here, the length of the FIR approximation is considered as a design variable which must be selected with care. Now, the elements of column k of $Q(z^{-1})$ are calculated as $$q_{i,k}(z^{-1}) = a_{MPinv,k}(z^{-1})a_{i,k}(z^{-1}) \qquad (28)$$

for i=1, K, M.

The diagonal element in row k and column k of $R(z^{-1})$ is defined as $$r_{k,k}(z^{-1}) = a_{MP,k}(z^{-1}) \qquad (29)$$

and the off-diagonal elements of row k of $R(z^{-1})$ is calculated as $$r_{k,j}(z) = q_k^{*T}(z)a_j^{(k)}(z^{-1}) = \sum_{i=1}^{M} q_{i,k}^*(z)a_{i,j}^{(k)}(z^{-1}) \quad (30)$$

for $j=k+1, K, N$.

In order to proceed with the next column of $Q(z^{-1})$, a new polynomial matrix $A^{(k+1)}(z^{-1})$ is defined in which the projections of $A^{(k)}(z^{-1})$ on the recently calculated column k of $Q(z^{-1})$ is subtracted. Thus, define column j of the matrix $A^{(k+1)}(z^{-1})$, for $k \geq 1$, as $$a_j^{(k+1)}(z^{-1}) = a_j^{(k)}(z^{-1}) - q_k(z^{-1})r_{k,j}(z^{-1}). \quad (31)$$

for $j=k+1, K, N$.

The remaining columns of $Q(z^{-1})$ are calculated by increasing k and repeat (25) to (31).

Spectral Factorization

Consider the polynomial element in row i and in column j of a polynomial matrix $A(z^{-1})$ $$a_{i,j}(z^{-1}) = \quad (32)$$
$$= a_{i,j,0} + a_{i,j,1}z^{-1} + a_{i,j,2}z^{-2} + K + a_{i,j,L}z^{-L}$$
$$= a_{i,j,0} \cdot z^{-L} \prod_{z_m \in Q_{in}^{(i,j)}} (z - z_m) \prod_{z_m \in Q_{out}^{(i,j)}} (z - z_m)$$

where $z_m \epsilon Q_{in}^{(i,j)}$ if $|z_m|^2 < 1$ (33)

and $z_m \epsilon Q_{out}^{(i,j)}$ if $|z_m|^2 \geq 1$ (34)

The squared second norm of column k of $A(z^{-1})$ $$s_k(z^{-1}) = \sum_{i=1}^{M} a_{ik}(z^{-1})a_{ik}^*(z) \quad (35)$$

can then be modeled by the individual roots of the elements in $A(z^{-1})$ $$s_k(z^{-1}) = \sum_{i=1}^{M} \left( a_{i,k,0} \cdot \prod_{z_m \in Q_{in}^{(i,k)}} (z - z_m) \right. \quad (36)$$
$$\left. \prod_{z_m \in Q_{out}^{(i,k)}} (z - z_m) \prod_{z_m \in Q_{in}^{(i,k)}} (z^{-1} - z_m^*) \prod_{z_m \in Q_{out}^{(i,k)}} (z^{-1} - z_m^*) \right)$$

or by the roots of the polynomial $$s_k(z^{-1}) = a_k \prod_{z_m \in Q_{in}^{(k)}} (z - z_m) \quad (37)$$
$$\prod_{z_m \in Q_{out}^{(k)}} (z - z_m) \prod_{z_m \in Q_{in}^{(k)}} (z^{-1} - z_m^*) \prod_{z_m \in Q_{out}^{(k)}} (z^{-1} - z_m^*)$$

where $z_m \in Q_{in}^{(k)}$ if $|z_m|^2 < 1$, (38)

$z_m \in Q_{out}^{(k)}$ if $|z_m|^2 \geq 1$ and (39)

$$\alpha_k = \sum_{i=1}^{M} \sum_{m=0}^{L} |a_{i,k,m}|^2.$$

The spectral factorization of $s_k(z^{-1})$ into minimum phase polynomials equals $$s_k(z^{-1}) = a_{MP,k}(z^{-1})a_{MP,k}^*(z). \quad (40)$$

such that $$a_{MP,k}(z^{-1}) = \beta_k \cdot z^{-L} \prod_{z_m \in Q_{in}^{(k)}} (z - z_m) \prod_{z_m \in Q_{out}^{(k)}} \left( z - \frac{1}{z_m^*} \right) \quad (41)$$

where $\beta_k = \sqrt{\alpha_k}$. Thus, the polynomial $a_{MP,k}(z^{-1})$ has all roots inside the unit circle.

Several algorithms for calculation of this spectral factorization are available. For example, the roots of the polynomial $s_k(z^{-1})$ can be explicitly calculated such that the minimum phase spectral factorization is calculated from (41). Alternatively, the method as described in U.S. Pat. No. 6,826,226 can be used. The process of calculating the minimum phase factor $a_{MP,k}(z^{-1})$ from $s_k(z^{-1})$ is denoted as $$a_{MP,k}(z^{-1}) = \text{MinPhaseFactor}\{s_k(z^{-1})\}. \quad (42)$$

Polynomial Truncation

The polynomial multiplications included in the Classical Gram Schmidt algorithm are listed in table 1. The polynomial channel matrix $H(z^{-1})$ is used as input.

TABLE 1

| | Minimum power of $z^{-1}$ | | Maximum power of $z^{-1}$ | |
|---|---|---|---|---|
| Polynomial operation | Unconstrained | Truncated | Unconstrained | Truncated |
| $s_1(z^{-1}) = h_1(z^{-1})h_1^{*T}(z) = \sum_{i=1}^{M} h_{i1}(z^{-1})h_{i1}^*(z)$ | $-L$ | | $L$ | |
| $h_{MP,1}(z^{-1}) = \text{MinPhaseFactor}\{s_1(z^{-1})\}$ | 0 | | $L$ | |
| $\frac{1}{h_{MP,1}(z^{-1})} \approx h_{MPinv,1}(z^{-1})$ | 0 | | | $L_{LD}$ |
| $q_{i,1}(z^{-1}) = h_{MPinv,1}(z^{-1})h_{i1}(z^{-1})$ | 0 | $-L_{Qnc}$ | $L_{LD} + L$ | $L_{Qc}$ |

TABLE 1-continued

| | Minimum power of $z^{-1}$ | | Maximum power of $z^{-1}$ | |
|---|---|---|---|---|
| Polynomial operation | Unconstrained | Truncated | Unconstrained | Truncated |
| $r_{l,1}(z^{-1}) = h_{MP,1}(z^{-1})$ | 0 | $-L_{Rnc}$ | L | $L_{Rc}$ |
| $r_{j,k}(z) = q_j^{*T}(z)h_k(z^{-1})$ | $-L_{Qc}$ | $-L_{Rnc}$ | $L_{Qnc} + L$ | $L_{Rc}$ |
| $a_k(z^{-1}) = h_k(z^{-1}) - \sum_{i=1}^{k-1} r_{i,k}(z^{-1})q_i(z^{-1})$ | $-L_{Rnc} - L_{Qnc}$ | $-L_{Anc}$ | $L_{Rc} + L_{Qc}$ | $L_{Ac}$ |
| $s_k(z^{-1}) = a_k^{*T}(z)a_k(z^{-1}) = \sum_{i=1}^{M} a_{i,k}^*(z)a_{i,k}(z^{-1})$ | $-L_{Ac} - L_{Anc}$ | | $L_{Anc} + L_{Ac}$ | |
| $a_{MP,1}(z^{-1}) = \text{MinPhaseFactor}\{s_k(z^{-1})\}$ | 0 | | $L_{Anc} + L_{Ac}$ | |
| $r_{k,k}(z^{-1}) = a_{MP,k}(z^{-1})$ | 0 | $-L_{Rnc}$ | $L_{Anc} + L_{Ac}$ | $L_{Rc}$ |
| $\frac{1}{a_{MP,k}(z^{-1})} \approx a_{MPinv,k}(z^{-1})$ | 0 | | $L_{LD}$ | |
| $q_{i,1}(z^{-1}) = a_{MPinv,k}(z^{-1})a_{ik}(z^{-1})$ | $-L_{Anc}$ | $-L_{Qnc}$ | $L_{LD} + L_{Ac}$ | $L_{Qc}$ |

The polynomial multiplications included in the Modified Gram Schmidt algorithm are listed in table 2. As input to this algorithm, the matrix $A^{(1)}(z^{-1})$ is defined as $A^{(1)}(z^{-1}) = H(z^{-1})$.

TABLE 2

| | Minimum power of $z^{-1}$ | | Maximum power of $z^{-1}$ | |
|---|---|---|---|---|
| Polynomial operation | Unconstrained | Truncated | Unconstrained | Truncated |
| $s_k(z^{-1}) = a_k^{(k)}(z^{-1})a_k^{(k)*T}(z)$ | $-L_{Anc} - L_{Ac}$ | | $L_{Ac} + L_{Anc}$ | |
| $a_{MP,k}(z^{-1}) = \text{MinPhaseFactor}\{s_k(z^{-1})\}$ | 0 | | $L_{Ac} + L_{Anc}$ | |
| $\frac{1}{a_{MP,k}(z^{-1})} \approx a_{MPinv,k}(z^{-1})$ | 0 | | $L_{LD}$ | |
| $q_{i,1} = a_{MPinv,k}(z^{-1})a_{ik}^{(k)}(z^{-1})$ | $-L_{Anc}$ | $-L_{Qnc}$ | $L_{LD} + L_{Ac}$ | $L_{Qc}$ |
| $r_{k,k}(z^{-1}) = a_{MP,k}(z^{-1})$ | 0 | $-L_{Rnc}$ | $L_{Ac}$ | $L_{Rc}$ |
| $r_{k,j}(z) = q_k^{*T}(z)a_k^{(k)}(z^{-1})$ | $-L_{Qc} - L_{Anc}$ | $-L_{Rnc}$ | $L_{Qnc} + L_{Ac}$ | $L_{Rc}$ |
| $a_j^{(k+1)}(z^{-1}) \triangleq a_j^{(k)}(z^{-1}) - q_k(z^{-1})r_{k,j}(z^{-1})$ | $-L_{Qnc} - L_{Rnc}$ | $-L_{Anc}$ | $L_{Qc} + L_{Rc}$ | $L_{Ac}$ |

The polynomial degree for each polynomial multiplication in CGS and MGS are given in table 1 and table 2, respectively. Here the minimum power of $z^{-1}$ and maximum power of $z^{-1}$ are listed as functions of the degrees of the polynomials involved in the multiplications. These values are referred to as unconstrained. A convention is also included in table 1 and table 2 of the polynomial powers after multiplication. If the introduced polynomial degree is smaller than the unconstrained value, then the result of the polynomial multiplication is truncated.

The parameters $L_{Qnc}$, $L_{Qc}$, $L_{Rnc}$, $L_{Rc}$, $L_{Anc}$, and $L_{Ac}$ are design variables, which should be selected with care.

Channel after Pre-Filtering

Figure 5:
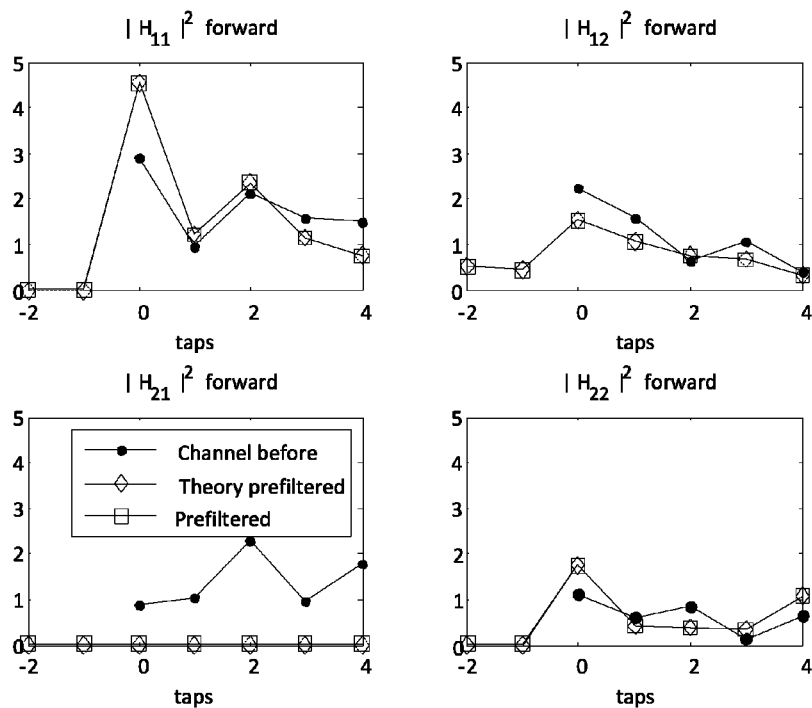
FIG. 5 shows graphs of radio channel characteristics.
Figure 6:
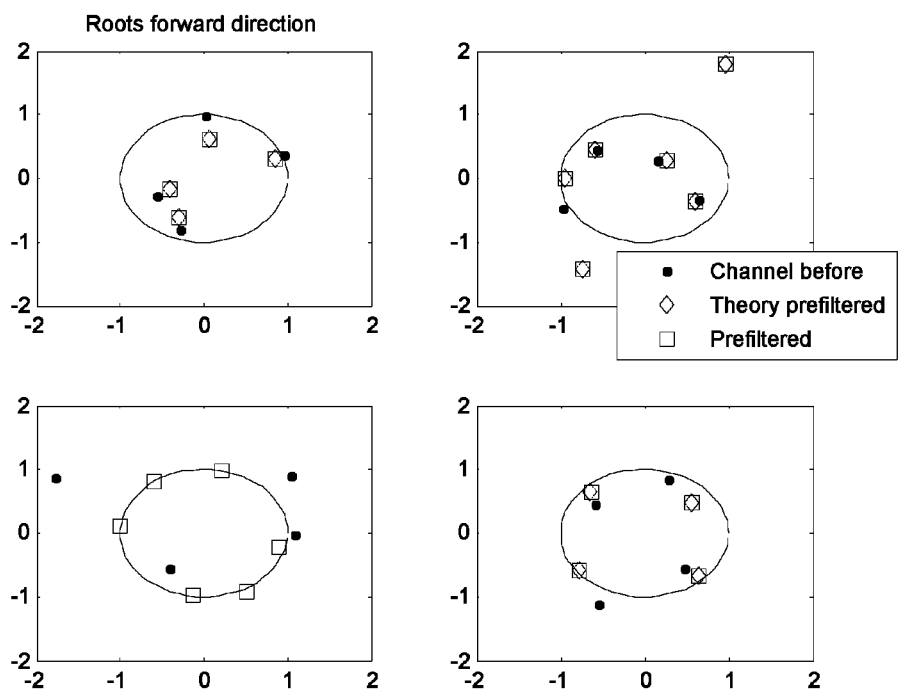
FIG. 6 shows graphs of radio channel characteristics.

The channels after pre-filtering are illustrated in FIG. 5. In the pre-filtering operation corresponding to FIG. 5, the filters on the main diagonal are minimum-phase filters, i.e. the energy is concentrated to the first taps. In FIG. 6, where the roots of the channels are shown. In the pre-filtering operation corresponding to FIG. 6, the pre-filtered channels on the main diagonal have all roots inside the unit circle, since these are minimum phase filters.

The channels after pre-filtering above the main diagonal are not minimum phase after pre-filtering, and can thus have roots both inside and outside the unit circle, see FIG. 6. Furthermore, the pre-filtered channels above the main diagonal might have non-causal values lager than zero, as illustrated in FIG. 5.

The channel after pre-filter is proposed to be calculated as a polynomial multiplication between the calculated pre-filter and the channel estimate, see illustration in the flow chart of FIG. 4. This channel after pre-filtering is in theory equal to the upper triangular polynomial matrix $R(z^{-1})$ from the QR-decomposition. However, approximations, polynomial truncations and limited calculation accuracy impacts the accuracy of the calculations of the MIMO pre-filter $\tilde{Q}(z^{-1})$. By using the same $\tilde{Q}(z^{-1})$ on the received signal and on the channel matrix $H(z^{-1})$ these inaccuracies are included in the calculated channel after pre-filtering.

The channel after pre-filtering can thus be calculated as $$g_{i,j}(z^{-1}) = q_i^{*T}(z^{-1})h_j(z^{-1}) \qquad (43)$$

The result of this polynomial multiplication can be truncated as indicted in table 3.

TABLE 3

| Polynomial operation | Minimum power of $z^{-1}$ | | Maximum power of $z^{-1}$ | |
|---|---|---|---|---|
| | Unconstrained | Truncated | Unconstrained | Truncated |
| $g_{ij}(z^{-1}) =$ $q_i^{*T}(z^{-1})h_j(z^{-1})$ | $-L_{Hnc} - L_{Qc}$ | $-L_{Gnc}$ | $L_{Hc} + L_{Qnc}$ | $-L_{Gnc}$ |

Figure 7:
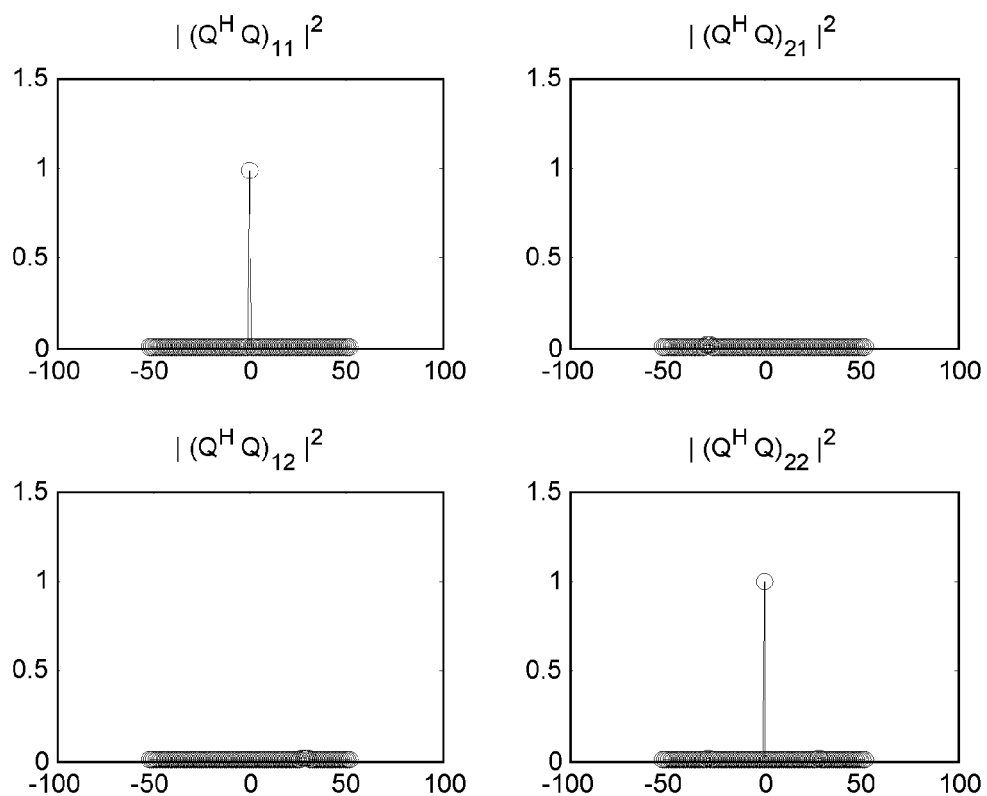
FIG. 7 shows graphs of radio channel characteristics.

An illustration of the whiteness of the noise after prefiltering is given in FIG. 7. Here, the elements of $$E\{\tilde{Q}(z^{-1})W(n)(\tilde{Q}(z)W(n-m))^{*T}\} = Q^{*T}(z^{-1})Q(z)\cdot\delta(n) = I\cdot\delta(n). \quad (44)$$

are illustrated which should be unity for time lag zero on the main diagonal and zero elsewhere.

The invention claimed is:

1. A method in a radio receiver for demodulating data signals transmitted by a plurality of transmitting antennas over a radio channel, the method comprising:
   receiving, on a plurality of receiving antennas, a data signal and a reference signal, the contents of the reference signal being known a priori to the receiver;
   calculating, using the contents of the reference signal, an estimated polynomial channel matrix;
   calculating a decomposition of the estimated polynomial channel matrix into a product of a paraunitary polynomial matrix and an upper triangular polynomial matrix with minimum phase filters on its main diagonal;
   calculating a polynomial pre-filter matrix as the paraconjugate of the paraunitary polynomial matrix; and
   demodulating the received data signal where the received data signal is multiplied with the calculated polynomial pre-filter matrix.

2. The method of claim 1, the method further comprising:
   calculating a pre-filtered polynomial channel matrix by multiplying the estimated polynomial channel matrix with the polynomial pre-filter matrix, thereby making the pre-filtered polynomial channel matrix upper triangular and with minimum phase filters on its main diagonal,
   wherein the demodulation of the received data signal further comprises using the pre-filtered polynomial channel matrix as the channel model in the demodulation.

3. The method of claim 1, wherein the calculation of the decomposition comprises assigning, to the first column of the paraunitary polynomial matrix, a normalized version of the first column of the estimated polynomial channel matrix, and, for each current column from a second column to a last column of the channel matrix:
   calculating projections of the current column of the estimated polynomial channel matrix on the previous columns of the paraunitary polynomial matrix,
   calculating a difference polynomial vector as the difference between the current column of the estimated polynomial channel matrix and a product of the calculated projections multiplied by the previous columns of the paraunitary polynomial matrix, and
   assigning, to the current column of the paraunitary polynomial matrix, a normalized version of the calculated difference polynomial vector.

4. The method of claim 3, wherein the normalization of the first column of the estimated polynomial channel matrix is performed by:
   normalizing with an inverse of a first scalar minimum phase polynomial, and the normalization of the respective calculated difference polynomial vectors is performed by:
   normalizing with an inverse of a respective current scalar minimum phase polynomial.

5. The method of claim 4, wherein the first scalar minimum phase polynomial is obtained by:
   calculating a spectral factorization of the squared second norm of the first column of the estimated polynomial channel matrix, and
   the respective current scalar minimum phase polynomial is obtained by:
   calculating a spectral factorization of the squared second norm of the current difference polynomial vector.

6. The method of claim 4, wherein the normalizations comprise:
   approximating the inverse of the scalar minimum phase polynomials with a respective finite impulse response polynomial after long division.

7. The method of claim 4, wherein the calculation of the decomposition comprises assigning, to an auxiliary polynomial matrix, the elements of the estimated polynomial channel matrix, and, for each current column from a first column to a last column:
   assigning, to the current column of the paraunitary polynomial matrix, a normalized version of the current column of the auxiliary polynomial matrix,
   calculating projections of the auxiliary polynomial matrix on the current column of the paraunitary polynomial matrix,
   updating the auxiliary polynomial matrix by subtracting a product of the current column of the paraunitary polynomial matrix and the calculated projections from the auxiliary polynomial matrix.

8. The method of claim 7, wherein the normalization of the columns of the auxiliary polynomial matrix is performed by normalizing with an inverse of a respective current scalar minimum phase polynomial.

9. The method of claim 8, wherein the respective current scalar minimum phase polynomial is obtained by calculating a spectral factorization of the squared second norm of the current column of the auxiliary polynomial matrix.

10. The method of claim 8, wherein the normalizations comprise approximating the inverse of the scalar minimum phase polynomials with a respective finite impulse response polynomial after long division.

11. A radio receiver for demodulating data signals transmitted by a plurality of transmitting antennas over a radio channel, the receiver comprising control and communication circuitry configured to:
   receive, on a plurality of receiving antennas, a data signal and a reference signal, the contents of the reference signal being known a priori to the receiver;
   calculate, using the contents of the reference signal, an estimated polynomial channel matrix;
   calculate a decomposition of the estimated polynomial channel matrix into a product of a paraunitary polynomial matrix and an upper triangular polynomial matrix with minimum phase filters on its main diagonal;
   calculate a polynomial pre-filter matrix as the paraconjugate of the paraunitary polynomial matrix; and
   demodulate the received data signal where the received data signal is multiplied with the calculated polynomial pre-filter matrix.

12. The radio receiver of claim 11, where the control and communication circuitry is further configured to:

calculate a pre-filtered polynomial channel matrix by multiplying the estimated polynomial channel matrix with the polynomial pre-filter matrix, thereby making the pre-filtered polynomial channel matrix upper triangular and with minimum phase filters on its main diagonal, and use the pre-filtered polynomial channel matrix as the channel model in the demodulation.

13. The radio receiver of claim 11, where the control and communication circuitry is further configured to assign, to the first column of the paraunitary polynomial matrix, a normalized version of the first column of the estimated polynomial channel matrix, and, for each current column from a second column to a last column of the channel matrix:

calculate projections of the current column of the estimated polynomial channel matrix on the previous columns of the paraunitary polynomial matrix, calculate a difference polynomial vector as the difference between the current column of the estimated polynomial channel matrix and a product of the calculated projections multiplied by the previous columns of the paraunitary polynomial matrix, and assign, to the current column of the paraunitary polynomial matrix, a normalized version of the calculated difference polynomial vector.

14. The radio receiver of claim 11, where the control and communication circuitry is further configured to assign, to an auxiliary polynomial matrix, the elements of the estimated polynomial channel matrix, and, for each current column from a first column to a last column:

assign, to the current column of the paraunitary polynomial matrix, a normalized version of the current column of the auxiliary polynomial matrix, calculate projections of the auxiliary polynomial matrix on the current column of the paraunitary polynomial matrix, update the auxiliary polynomial matrix by subtracting a product of the current column of the paraunitary polynomial matrix and the calculated projections from the auxiliary polynomial matrix.

15. A non-transitory computer-readable medium comprising, stored thereupon, a computer program product comprising software instructions that, when executed in a processor of a radio receiver, causes the radio receiver to demodulate data signals transmitted by a plurality of transmitting antennas over a radio channel by:

receiving, via a plurality of receiving antennas, a data signal and a reference signal, the contents of the reference signal being known a priori to the receiver;

calculating, using the contents of the reference signal, an estimated polynomial channel matrix;

calculating a decomposition of the estimated polynomial channel matrix into a product of a paraunitary polynomial matrix and an upper triangular polynomial matrix with minimum phase filters on its main diagonal;

calculating a polynomial pre-filter matrix as the paraconjugate of the paraunitary polynomial matrix; and demodulating the received data signal where the received data signal is multiplied with the calculated polynomial pre-filter matrix.

* * * * *